April 9, 1929.        G. O. BURLEW        1,708,050

TOOTHBRUSH

Filed Sept. 10, 1927

INVENTOR.
Gilderoy O. Burlew
BY
ATTORNEY

Patented Apr. 9, 1929.

1,708,050

UNITED STATES PATENT OFFICE.

GILDEROY O. BURLEW, OF NEWARK, NEW JERSEY.

TOOTHBRUSH.

Application filed September 10, 1927. Serial No. 218,696.

This invention relates to compositions of matter used in the manufacture of tooth brushes and the object is to provide a substance where flexibility, elasticity and absorbent properties are desirable, such as tooth brushes of various kinds, where a pliable, yielding, clinging, non-slipping surface is required.

The composition consists of a mixture of two well-known materials, to wit, sponge and rubber in such proportions and in the manner hereinafter disclosed.

Sponge, as is well-known commercially, is an animal substance, being the skeleton of a marine animal, having an extremely porous consistency composed of a network of elastic tenacious fibers, remaining after the removal of the living matter, these fibers, when magnified, appearing as slender bodies, resembling horn, integrally connected to enclose more or less minute chambers each capable of absorbing liquid to the point of saturation.

The action of a wet sponge is known to be sodden, sluggish and dull, having in effect a clinging tendency, highly useful when used in wiping a surface.

Rubber on the contrary is highly elastic, substantially non-absorbent vegetable product having the property of gliding over a wet surface rather than adhering to it.

It may be colored by the incorporation of desired pigments, toughened and hardened by heat, as in vulcanization, and readily lends itself to molding operations whereby any shape may be produced.

Experience has demonstrated that a tooth brush composed solely of rubber does not have a desirable clinging and wiping effect, but slides over the wet surfaces, whereas the introduction of sponge fragments is found to counteract such tendency, causing the brush to grip and drag over the surfaces irrespective of their condition.

Also due to the porous nature of the sponge, a cleansing preparation may be applied and caused to clean the teeth in an effective manner.

Figure 1:
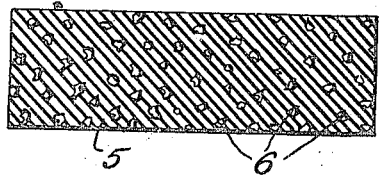
Figure 2:
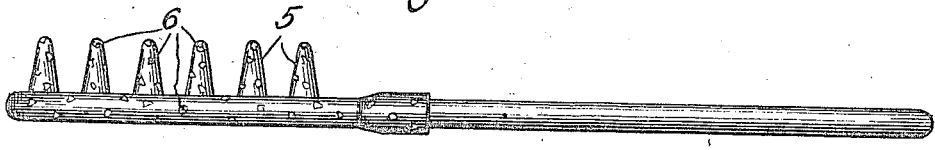

Figure 1 represents a blank showing the composition of the material used in making my improved tooth brush. Figure 2 represents a side elevational view of a tooth brush made in accordance with my invention.

It is preferred to use the ingredients in about the bulk proportion of twenty percent sponge and eighty percent rubber, but a very considerable latitude may be included in accordance with the purpose for which it is used.

The manner of making the composition is simple, consisting merely of comminuting the sponge by chopping or the like to produce small fragments 6, such as would readily pass through a screen of 10 to 20 per inch, dispose the same in molds with fragments of pure fresh rubber gum and submit the whole to a vulcanizing process. The relative proportion of sponge and rubber may be varied from one fifth to one half of the entire mass.

It is found the rubber 5 will penetrate the interstices of the sponge fragments, binding them firmly, but permitting the sponge to retain its property of absorption, and as wear takes place, the fine fibers of the sponge give the object a downy, fur-like appearance that operates as an excellent wiping surface.

Having thus described my invention and set forth the best known manner of preparing and mixing the ingredients, what I claim as new and desire to secure by Letters Patent, is:—

1. A tooth brush composed wholly of a pliable composition comprising rubber forty to eighty parts by measure, and chopped sponge twenty to forty parts by measure, said rubber and sponge being subjected to heat sufficient to cause coalescence, said sponge protruding from the surface of the rubber.

2. A new article of manufacture consisting of a tooth brush having a molded body having a plurality of integral prongs composed wholly of rubber having fragments of sponge incorporated therein, said sponge protruding from the surface of the rubber.

This specification signed and witnessed this eighth day of September, 1927.

GILDEROY O. BURLEW.